(12) United States Patent
Benz et al.

(10) Patent No.: US 6,434,128 B1
(45) Date of Patent: Aug. 13, 2002

(54) METHOD FOR CHANNEL ASSIGNMENT AND A RADIO COMMUNICATIONS SYSTEM

(75) Inventors: Michael Benz, Berlin (DE); Wanlin Li, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/370,251

(22) Filed: Aug. 9, 1999

(51) Int. Cl.⁷ .................................................. H04J 3/00
(52) U.S. Cl. .................. 370/329; 370/280; 370/337; 370/442
(58) Field of Search ................................. 370/252, 280, 370/442, 337, 347, 336, 341, 329; 455/450, 452, 453, 455

(56) References Cited

U.S. PATENT DOCUMENTS

| | | | | |
|---|---|---|---|---|
| 4,267,592 A | * | 5/1981 | Craiglow | 370/29 |
| 5,260,944 A | | 11/1993 | Tomabechi | |
| 5,515,366 A | * | 5/1996 | Chieu et al. | 370/50 |
| 5,732,073 A | * | 3/1998 | Kusaki et al. | 370/280 |
| 5,930,716 A | * | 7/1999 | Sonetaka | 455/450 |
| 6,160,801 A | * | 12/2000 | Uchida et al. | 370/337 |
| 6,353,598 B1 | * | 3/2002 | Baden et al. | 370/280 |

OTHER PUBLICATIONS

"Performance Issues and Algorithms for Dynamic Channel Assignment" (Chuand), 8272 IEEE Journal on Selected Areas in Communications, vol. 11, No. 6, 1993, pp. 954–963.
Published European Patent Application No. 98 107 763.
Published German Patent Application No. 197 51 110.
Published German Patent Application No. 198 20 726.
Published German Patent Application No. 198 18 325;.
Published German Patent Appliction No. 198 27 916;.

* cited by examiner

*Primary Examiner*—Lester G. Kincaid
*Assistant Examiner*—N. Mehrpour
(74) *Attorney, Agent, or Firm*—Laurence A. Greenberg; Werner H. Stemer; Ralph E. Locher (57) ABSTRACT

In a method for channel assignment according to the invention, a TDD transmission method with timeslots as channels is used for radio transmission between a base station and mobile stations, with a switching point separating timeslots for a up link direction and timeslots for a down link direction. A transmission parameter relating to a transmission quality is in each case defined for the radio transmission between the base station and a plurality of mobile stations. The mobile stations with the qualitatively better transmission parameter are preferably assigned timeslots close to the switching point.

20 Claims, 7 Drawing Sheets

METHOD FOR CHANNEL ASSIGNMENT AND A RADIO COMMUNICATIONS SYSTEM

BACKGROUND OF THE INVENTION

Field of the Invention

The invention relates to a method for channel assignment, and to a radio communications system, in particular a mobile radio system with time division duplex (TDD) subscriber separation.

In radio communications systems, information (for example voice, video information or other data) is transmitted with the aid of electromagnetic waves via a radio interface between a transmitting radio station and a receiving radio station (base station and mobile station, respectively). The electromagnetic waves are in this case transmitted at carrier frequencies that are in the frequency band intended for the respective system. Frequencies in the frequency band at about 2000 MHz are intended to be used for future mobile radio systems using CDMA or TD/CDMA transmission methods via the radio interface, for example the universal mobile telecommunication system (UMTS) or other third-generation systems.

Frequency division multiple access (FDMA), time division multiple access (TDMA) or a method known as code division multiple access (CDMA) are used to distinguish between signal sources, and thus for evaluation of the signals. One particular version of time division multiple access is a TDD (time division duplex) transmission method, in which the transmission is made in a common frequency band, separated in time both in the up link direction, that is to say from the mobile station to the base station, and in the down link direction, that is to say from the base station to the mobile station.

The TDD transmission method supports, in particular, asymmetric services in which the transmission capacity in the up link direction does not need to be the same as that in the down link direction. As a rule, the asymmetry will not be desirable to the same extent in all the radio cells, thus resulting in a critical interference scenario. The analyses relating to the TDD transmission method that have been carried out so far have underestimated the problems of mutual interference between a large number of base stations and mobile stations which are being operated in the same frequency band.

SUMMARY OF THE INVENTION

It is accordingly an object of the invention to provide a method for channel assignment and a radio communications system that overcomes the above-mentioned disadvantages of the prior art devices of this general type, in which interference is further reduced.

With the foregoing and other objects in view there is provided, in accordance with the invention, a method for assigning channels in a radio communications system, which includes:

using a time division duplex transmission method with timeslots as channels for a radio transmission between a base station and mobile stations and with switching points separating the timeslots for an up-link direction and the timeslots for a down-link direction;

defining in each case at least one transmission parameter relating to a transmission quality for the radio transmission between the base station and the mobile stations; and assigning the timeslots close to a switching point of the switching points to the mobile stations having a qualitatively better transmission parameter.

In the method for channel assignment according to the invention, a TDD transmission method with timeslots as channels is used for radio transmission between the base station and the mobile stations, with a switching point separating timeslots for the up link direction and timeslots for the down link direction. A transmission parameter relating to the transmission quality is in each case defined for the radio transmission between the base station and the plurality of mobile stations. The mobile stations with the qualitatively better transmission parameter are preferably assigned timeslots close to the switching point.

If the switching points for adjacent radio cells differ, then interference is unavoidable despite frame synchronization. However, since the links to mobile stations with good transmission quality are disposed around the switching point, then their transmission power, inter alia, can be set on the basis of the good transmission conditions to a minimal interference influence for the other mobile stations and base stations. This reduces the interference between radio cells in the radio communications system.

According to an advantageous development of the invention, an area switching point is defined in a group of adjacent base stations, and the mobile stations with the qualitatively better transmission parameter are preferably assigned timeslots between the radio-cell-specific switching point and the area switching point. This reduces the interference not only with respect to a cell, but in at least one subregion of the radio communications system. The area switching point indicates an average value for the asymmetry, on an area basis. A first upper boundary is advantageously defined for the difference between the radio-cell-specific switching point and the area switching point. If there is little interference between adjacent cells, for example between different rooms when indoors, then a high upper boundary can be set. It is likewise advantageous for the first upper boundary to be set as a function of the number of mobile stations for which a qualitatively good transmission parameter has been determined. The boundary thus does not place any excessive limitation on the transmission capacity if the timeslots around the switching point can scarcely be filled when there are few mobile stations with good transmission parameters.

It is within the context of the invention for a base switching point to be defined in the radio communications system, from which base switching point the radio-cell-specific switching points and the area switching points may have an error of only a maximum of a second upper boundary. This measure assists the administration of the switching points throughout the network, and keeps interference beyond area boundaries low.

In this case, it is advantageous for buffer zones, with radio cells in which the base switching point is binding, to be administered between groups of base stations with different area switching points. This provides a low-interference transition between areas that have a very different requirement with regard to the asymmetry of radio transmission.

The introduction of area switching points and a base switching point results in a frame within which the individual base stations can set the radio-cell-specific switching point as required, without this having to be harmonized by using higher function layers.

Particularly for transmission methods which use a number of switching points within a frame, an alternative embodiment of the invention defines a standard TDD scheme to which, however, the base stations in the individual radio cells are not bound. In order to reduce interference, the mobile stations with the qualitatively better transmission parameters are preferably assigned timeslots which are used, rather than the standard TDD scheme, for the opposite transmission direction. A change from the standard TDD scheme leads to one or more timeslots no longer being used for the up link direction, but for the down link direction (or vice versa). Since it can be assumed from this that the standard TDD scheme is being used in the adjacent radio cell, these timeslots which are susceptible to interference are assigned to the links to mobile stations with good transmission quality.

It is particularly advantageous for the change from the standard TDD scheme to be made in a pre-set manner or in a manner that has been negotiated with the adjacent base stations, that is to say, of a number of possible timeslots which can be used in the opposite transmission direction, a number of base stations as far as possible use the same timeslots for this purpose. This results in less interference, despite a change from the standard TDD scheme.

The transmission parameter or parameters which forms or form the basis for channel assignment is or are related to a signal delay time between the base station and the mobile station, to a reception power level in the respective receiving station, to the influence of interference on the radio transmission from and/or to the mobile station on adjacent radio cells, and/or on the position of the mobile station within the radio cells. These variables can be derived, without any major additional effort, from the transmission characteristics that are normally determined for the radio link between the base station and the mobile station. Corresponding to the good transmission quality, the transmission relationships for the mobile stations with timeslots around the switching point are set to achieve low interference levels for the adjacent cells.

According to an advantageous development of the invention, radio transmission within at least parts of the radio communications system is set to be frame-synchronous, and the switching points of adjacent base stations are set as a function of the traffic. Frame synchronization reduces the interference. Setting the switching point as a function of traffic leads to improved utilization of the transmission capacity, since the up link direction or the down link direction may be preferred, depending on the requirement.

Other features which are considered as characteristic for the invention are set forth in the appended claims.

Although the invention is illustrated and described herein as embodied in a method for channel assignment and a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
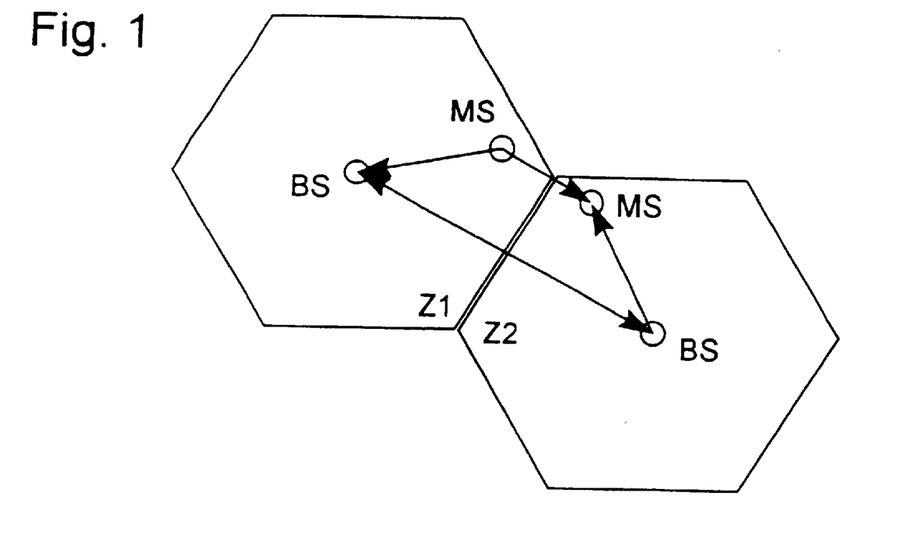
FIG. 1 is a diagrammatic illustration of two adjacent cells.

In all the figures of the drawing, sub-features and integral parts that correspond to one another bear the same reference symbol in each case. Referring now to the figures of the drawing in detail and first, particularly, to FIG. 1 thereof, there is shown two adjacent cells Z1 and Z2 each with a base stations BS and a mobile station MS. The mobile station MS which is receiving signals from the base station BS assigned to it will suffer particularly severe interference from a mobile station MS which is located close by in the adjacent cell. This situation is particularly critical at cell boundaries, and this situation occurs very frequently when the mobile stations MS are distributed homogeneously.

Figure 2:
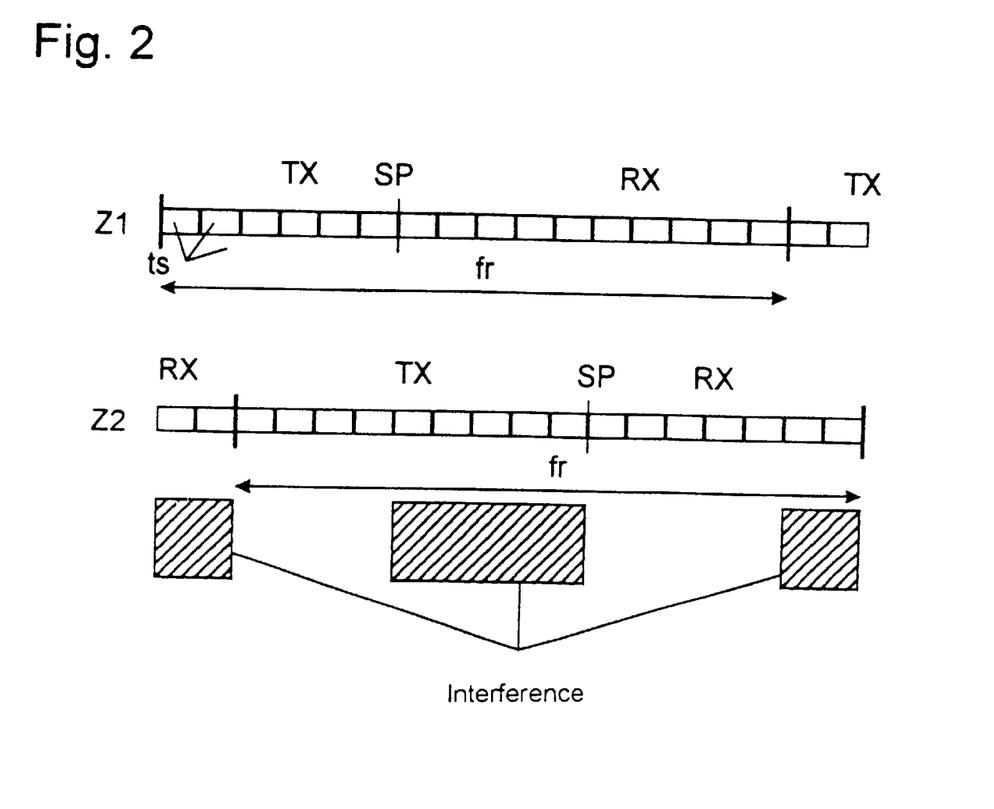
FIG. 2 is an illustration of a frame.

For example, as shown in FIG. 2, interference occurs in the constellation since a transmission period TX of a mobile station MS overlaps a reception period RX of the other mobile station MS. A switching point SP in this case always separates the transmission period TX and the reception period RX. For frame-by-frame transmission, where a frame fr includes a number of timeslots ts, the interference is proportional to the shift in the start of the frame and the position of the switching point SP between the two cells Z1, Z2. Severe interference causes losses in the spectral efficiency of the radio communications system. Earlier, commonly assigned European Patent Application EP 98 107 763 A and earlier, commonly assigned, German Patent Application DE 198 18 325 A disclose solutions for reducing the interference caused by frame synchronization.

Figure 3:
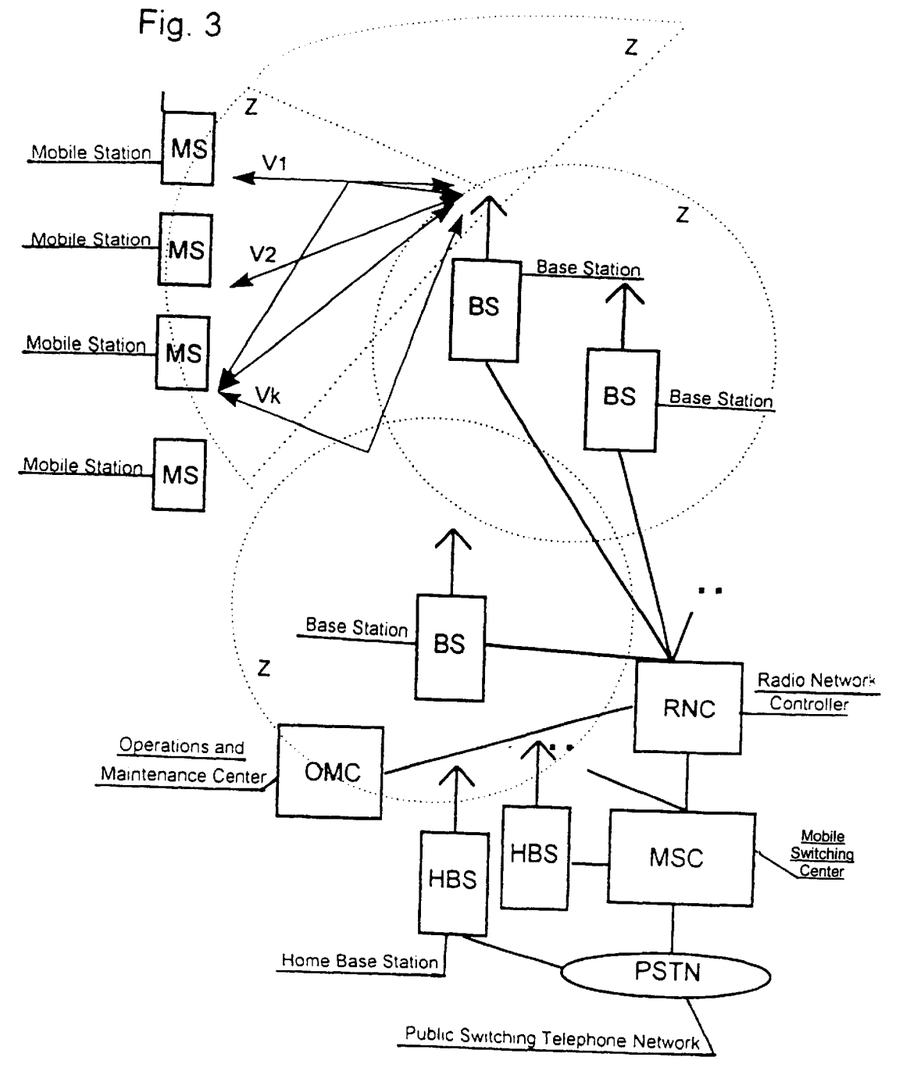
FIG. 3 is a block diagram of a mobile radio system.

The mobile radio system shown in FIG. 3, as an example of a radio communications system, contains mobile switching centers (MSC) which are networked to one another and produce access to a public switched telephone network (PSTN). Furthermore, the mobile switching centers MSC are in each case connected to at least one radio network controller (RNC) for radio resource management. Each of the radio network controllers RNC in turn allows a link to at least one base station BS.

Such a base station BS can use a radio interface to set up a link to other radio stations, for example mobile stations MS or other types of mobile and stationary terminals. At least one radio cell Z is formed by each base station BS. A number of radio cells Z are also supplied per base station BS if a sector system or hierarchical cell structures are used. By way of example, FIG. 3 shows links V1, V2, Vk for transmitting wanted information and signaling information between mobile stations MS and a base station BS.

An operation and maintenance center OMC provides monitoring and maintenance functions for the mobile radio system, or for parts of it. The functionality of this structure can be transferred to other radio communications systems in which the invention can be used, in particular for subscriber access networks with wire-free subscriber access. The base stations BS which are used as home base stations HBS in the private domain can also set up links to the mobile stations MS, without having to be affected by the radio network plan. These home base stations HBS are not linked directly to the radio network controller RNC for radio resource management, but are connected to a public switched telephone network PSTN or to a mobile switching center MSC. Frame synchronization for the home base stations HBS is carried out by radio or via fixed links to other network components.

The frame structure for radio transmission is disclosed in earlier, commonly assigned German Patent Application DE 198 27 916. One frequency band is used alternately for transmitting in the up link direction and the down link direction. Subscriber separation is provided on a timeslot basis (TDMA time division multiple access), in which case it is also possible to distinguish between the subscribers within the timeslots using an individual spread code (CDMA code division multiple access). Such a TDD subscriber separation method (time division duplex), which is intended for asymmetric data services, can be advantageously implemented, in particular for microcellular and indoor applications, in third-generation radio communications systems.

Figure 4:
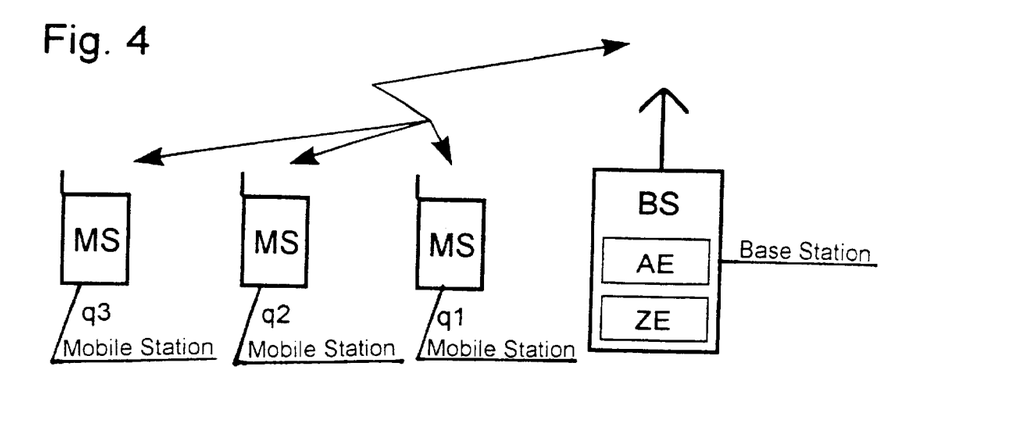
FIG. 4 is a block diagram of another configuration of the mobile radio system.

The traffic asymmetry achieved by shifting the switching point SP is in this case time-dependent and position-dependent, since it depends on the services currently being used by the subscribers. The time-dependent and position-dependent requirement is achieved by individually setting the switching point SP in the radio cells Z, with these settings following the traffic, and being quickly variable in time. In addition to considerations relating to timeslot clustering within the mobile radio system, as in the earlier, commonly assigned German Patent Application DE 198 20 736, and relating to assignment strategies for links with a plurality of channels, as in the earlier, commonly assigned German Patent Application DE 197 51 110, channel assignment based on the method according to the invention in each case takes account of a transmission parameter q1, q2, q3 relating to the transmission quality for the radio transmission between the base station ES and a plurality of mobile stations MS. FIG. 4 shows that a transmission parameter q1, q2, q3 for the radio transmission is determined per mobile station MS by a device AE for defining transmission parameters. According to the invention, it is unnecessary to have a transmission parameter from all mobile stations MS. It is sufficient to be able to select at least a number of mobile stations MS with good transmission quality. The base station BS also includes an assignment device ZE which, as will be explained later, carries out the setting of the switching point SP and the assignment of the mobile stations MS to timeslots. The device AE for defining transmission parameters and the assignment device ZE may also, alternatively, be integrated in other network components.

Furthermore, it is within the context of the invention for a plurality of parameters to be defined per mobile station MS, which are then combined to form the transmission parameter q1, q2, q3. Such fundamental parameters are the signal delay time between the base station BS and the mobile station MS, the reception power level at the respective receiving station, the interference influence on the radio transmission on adjacent radio cells (the transmission power level is, for example, a measure of this) and the position of the mobile station within the radio cell.

Figure 5:
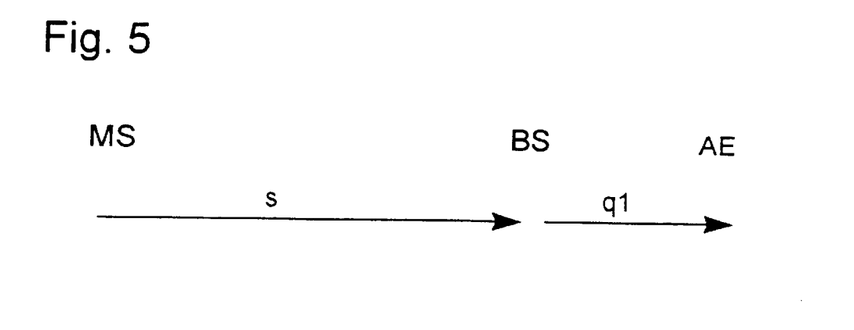
FIGS. 5 and 6 show the definition of the transmission parameters for a radio transmission between a base station and mobile stations.
Figure 6:
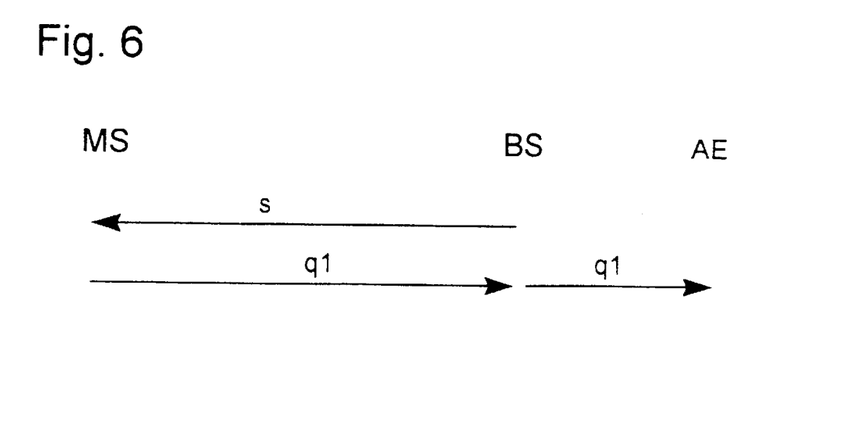

The transmission parameters q1, q2, q3 may in this case relate to the radio transmission in the up link direction or in the down link direction. The former case is shown in FIG. 5, where transmissions s from the mobile station MS are received in the base station BS. A device AE for defining transmission parameters q1 in the base station BS evaluates the received signals, and thus defines the transmission parameter q1. Alternatively, or additionally, the received signals are evaluated, as shown in FIG. 6, in the mobile station MS for transmissions s from the base station BS. The mobile station MS defines values q1', and signals these to the base station BS. The values q1' are received in the device AE, and are used to define the transmission parameter q1.

Figure 7:
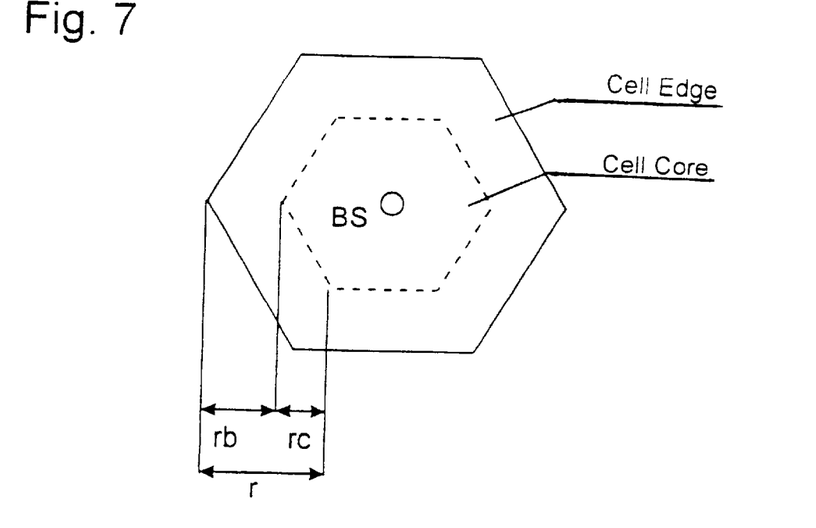
FIG. 7 is an illustration of how a radio cell is split into a cell core and a cell edge.

FIG. 7 shows how the radio cell, which is shown for simplicity as a hexagon, is subdivided into a cell edge with a width rb and a cell core with a width rc. An overall radius of the cell is equal to r. The cell core corresponds to good transmission conditions, and the cell edge to poorer transmission conditions.

The width rb of the cell edge is greater than a minimum width $rb_{min}$, with the minimum width $rb_{min}$ being chosen in such a manner that the attenuation on the path between the base station BS and the mobile station MS is sufficiently great to allow radio transmission in the up link direction in the cell core, and radio transmission in the down link direction in the cell edge. The mobile stations MS with good transmission parameters q1 are located in the cell core. The mobile stations MS of those subscribers who are located in the cell core are referred to in the following text as non-critical subscribers; the subscribers in the cell edge are referred to as critical subscribers.

Figure 8:
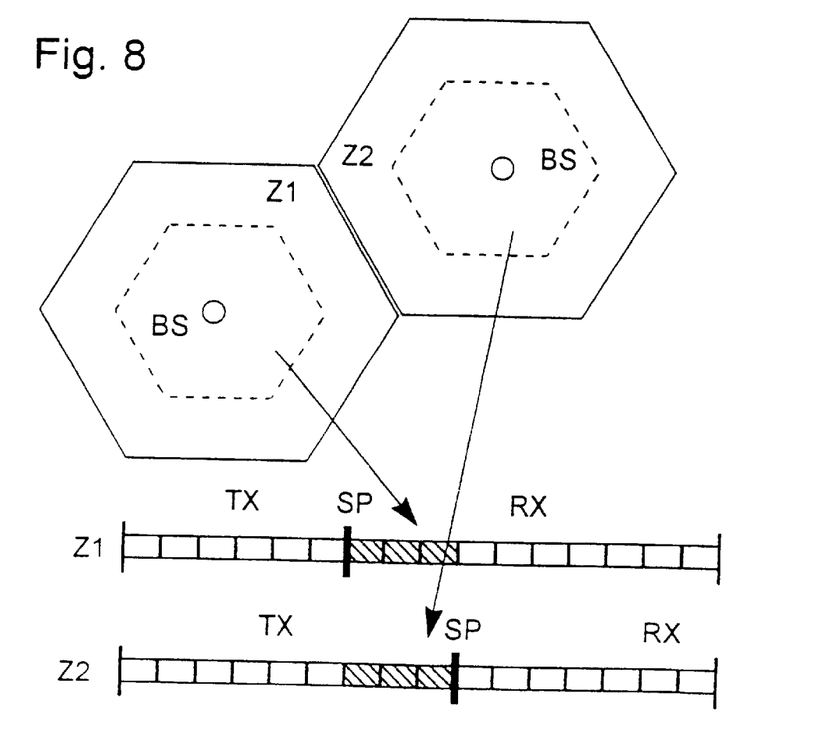
FIG. 8 is an illustration showing an assignment of the mobile stations to timeslots.

A situation as shown in FIG. 8 arises for the two radio cells, Z1, Z2 of the adjacent base stations BS. The radio transmission of both of the base stations BS is admittedly frame-synchronized, but different switching points SP are set between the transmission period TX and the reception period RX of the base stations BS in the two radio cells Z1, Z2 as a function of the traffic. The timeslots between the two switching points SP are exclusively filled with non-critical subscribers, so that the interference beyond the cell edge is greatly reduced. There is no need for coordination of the switching points SP between the radio cells Z1, Z2. The switching point SP can thus be set on a radio-cell-specific basis, depending on the requirement, without delays.

However, such channel assignment, which preferably assigns the non-critical subscribers with the good transmission parameters q1 to the timeslots around the switching point SP, is still limited since the number of timeslots which can be filled with non-critical subscribers depends on also knowing the switching point SP of the adjacent radio cell, and on the number of noncritical subscribers.

Figure 9:
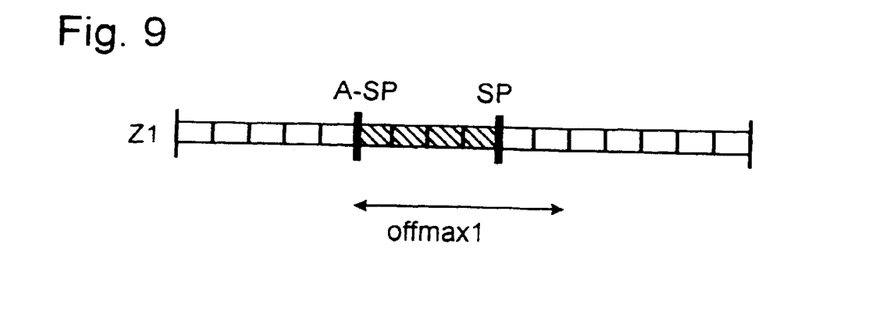
FIGS. 9 and 10 are schematic illustrations of the use of an area switching point.

FIG. 9 shows how an area switching point A-SP is introduced, which is defined for a group of base stations BS in an area. A first upper boundary offmax1 is defined for the difference (number of timeslots) between the radio-cell-specific switching point SP and the area switching point A-SP, and this first upper boundary must not be exceeded when the radio-cell-specific switching point SP is being set individually. The first upper boundary offmax1 results from the current number of non-critical subscribers, and is thus time-dependent.

Figure 10:
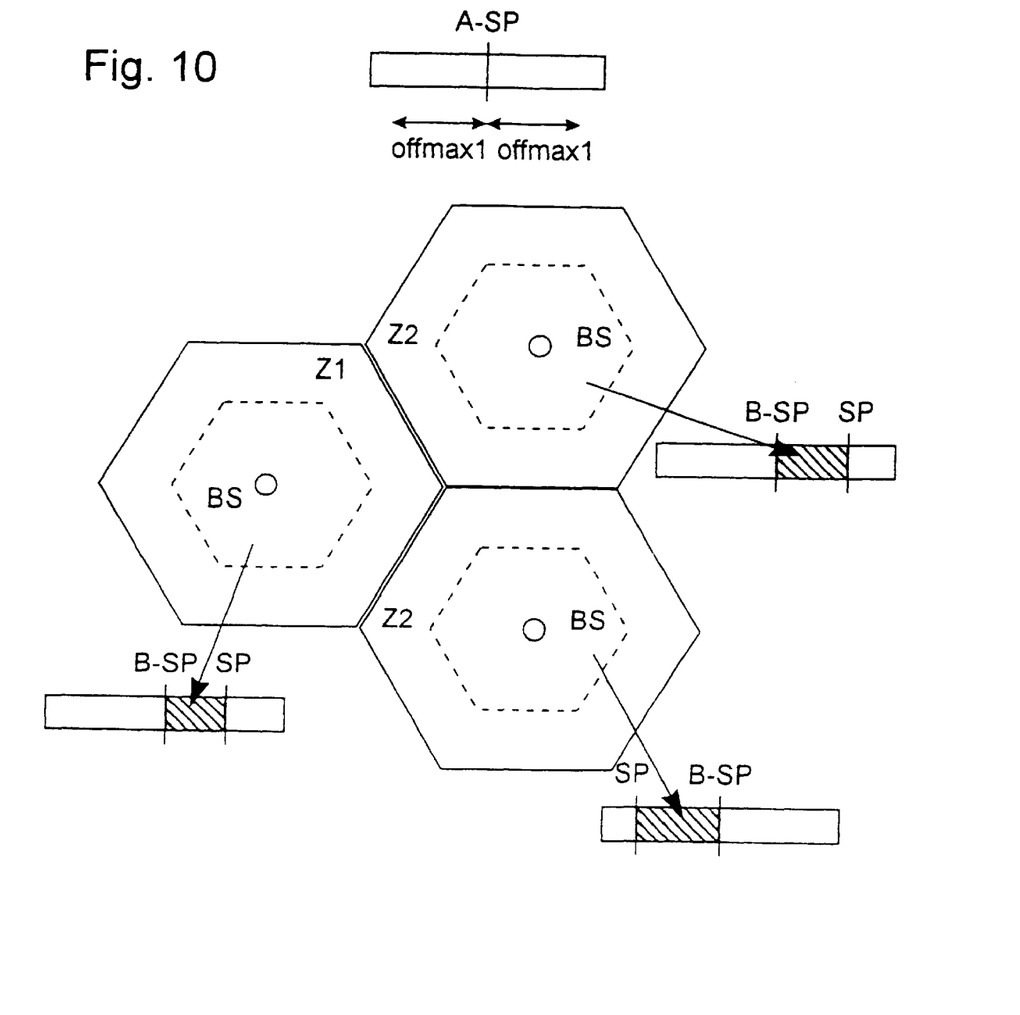

As shown in FIG. 10, for adjacent radio cells, Z1, Z2, Z3 this results in that the timeslots between the radio-cell-specific switching point SP and the area switching point A-SP are filled with the non-critical subscribers. If the difference between the radio-cell-specific switching point SP and the area switching point A-SP is less than the first upper boundary offmax1, then no coordination outside the radio cells Z1, Z2, Z3 is required. Each base station BS may choose the switching point SP freely, without limiting the choice of the adjacent base stations BS. There is also no need for any harmonization with a component of the mobile radio system that is carry out higher-level functions, such as the RNC.

However, the first upper boundary offmax1 also prevents the use of extreme asymmetries. In order nevertheless to support such extreme asymmetries, for example all the timeslots in a frame being assigned exclusively to the down link direction, the area switching points A-SP of different areas may differ.

Figure 11:
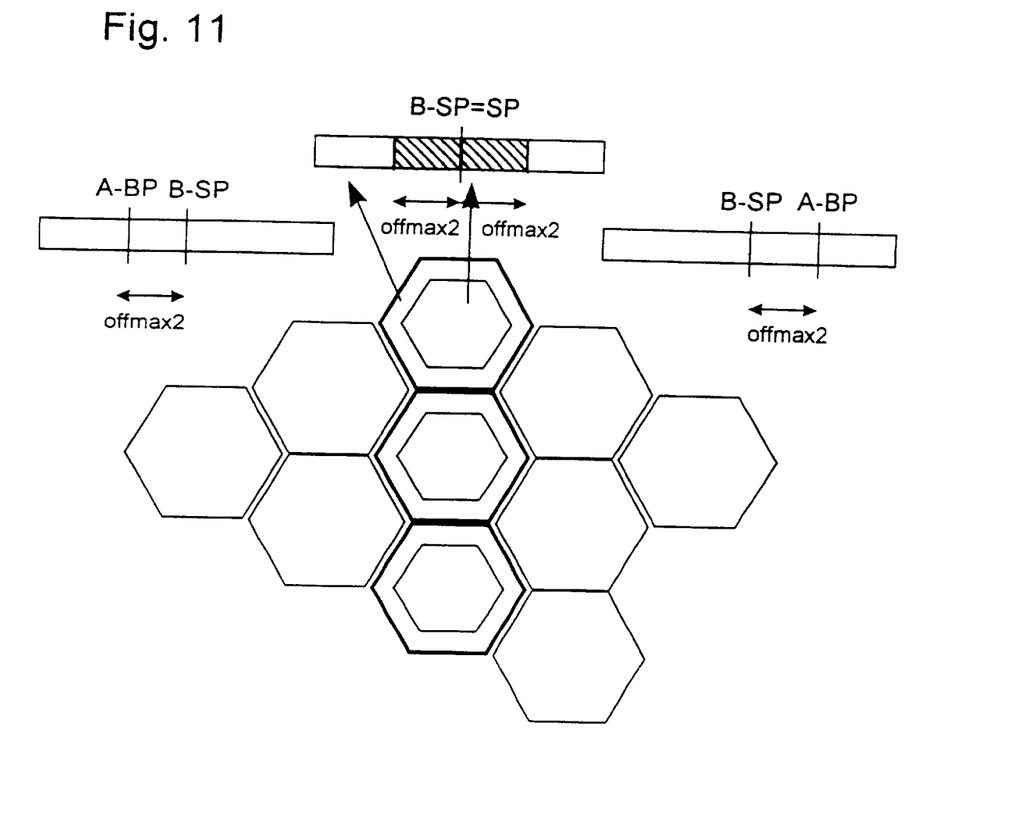
FIG. 11 is a schematic illustration of the use of a base switching point.

In order to administer this, a base switching point B-SP is introduced, which is binding for the entire mobile radio system. The individual area switching points A-SP have various differences from the base switching point B-SP, but these must not be greater than a second upper boundary offmax2. As shown in FIG. 11, a buffer zone with radio cells for which the base switching point B-SP is binding as the switching point SP is also set up between areas with different area switching points A-SP.

Within the TDD frame for the buffer zone, a protection region is defined which, based on the base switching point B-SP in both directions, and contains the number of timeslots corresponding to the second upper boundary offmax2. This protection region must not be filled with critical subscribers, that is to say these timeslots are assigned to non-critical subscribers, or they remain free. If there are a sufficient number of non-critical subscribers in the radio cells in the buffer zone, no resources remain unused. Provided the second upper boundary offmax2 is not set to be excessively high, then this is normally the case.

As a result of the administration of radio-cell-specific area and base switching points SP, A-SP, B-SP, asymmetric traffic with fast reallocations of resources from the up link direction to the down link direction, and vice versa, is supported without major signaling complexity being required for coordination between the base stations BS. The disturbing interference between the radio transmissions nevertheless remains low.

Figure 12:
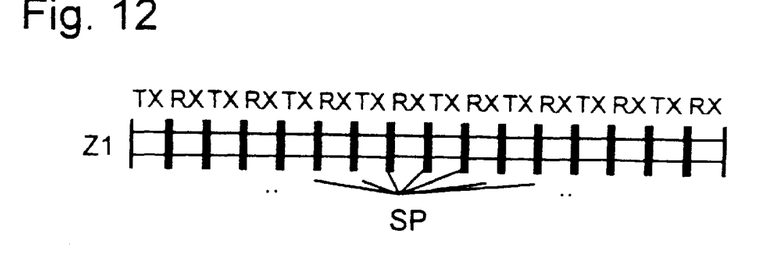
FIGS. 12 to 15 are illustrations of a switching of timeslots from an up link direction to a down link direction, and a low-interference assignment of mobile stations to timeslots.

FIGS. 12 to 15 are used to explain an exemplary embodiment in the radio cell Z1, which exemplary embodiment refers to a TDD frame in which a plurality of switching points SP between the up link direction and the down link direction are defined as standard. Each of the switching points SP in turn separates the transmission period TX and the reception period RX for the base station BS. An exemplary standard TDD scheme is thus defined, based on switching the transmission direction after each timeslot (FIG. 12). It is within the context of the invention for other combinations to be possible as well.

Figure 13:
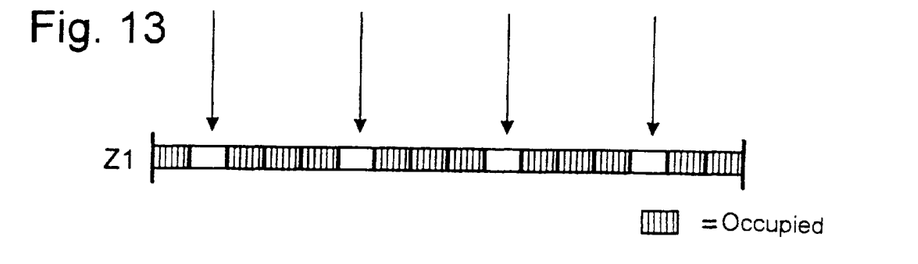

If the down link direction (transmission period TX) is more heavily loaded than the up link direction (reception period RX), then it is desirable to set the switching point SP such that they are better matched to the asymmetric requirement. FIG. 13 shows such a situation, in which some of the timeslots for the up link direction are unused, while the down link direction is fully loaded.

Figure 14:
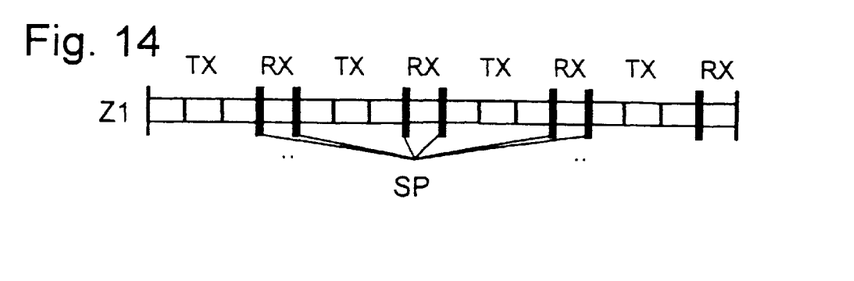
Figure 15:
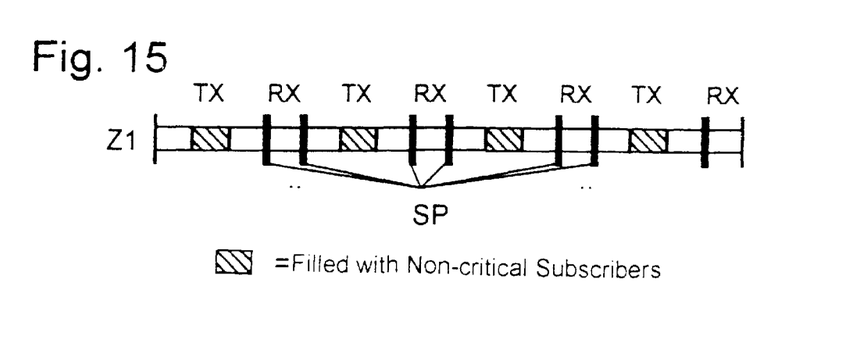

In order to cope with this situation, a change from the standard TDD scheme is made in the radio cell Z1 and the switching points SP are reset as shown in FIG. 14, so that more transmission capacity is available in the down link direction. This is done by removing (or adding) some of the switching points SP, rather than by shifting the switching points SP. However, to do this, the timeslots whose transmission direction is intended to be reversed must not previously have been filled. The subsequent assignment of the mobile stations MS to these switched timeslots is carried out such that the non-critical subscribers are assigned to these timeslots. These timeslots are thus not necessarily close to the nearest switching point SP but, as shown in FIG. 15, are, for example, in the middle of three timeslots for the down link direction.

The change from the standard TDD scheme is made in a pre-set manner or in a manner harmonized with the adjacent base stations. Thus, for example in a frame shown in FIG. 15, the second timeslot is switched first, followed by the sixth, tenth and finally the fourteenth timeslot, depending on the requirement. The switching is carried out in this way, although independently of one another, in a number of the base stations BS. The non-critical subscribers are assigned, in particular, to the most recently switched timeslots. The number of mobile stations MS with good transmission conditions, which are required to fill these timeslots thus falls. If the number of mobile stations MS with good transmission conditions is insufficient, then the minimum possible interference is nevertheless achieved.

The standard TDD scheme is spatially invariant in at least parts of the radio communications system, but may vary with time, by renewed definition.

We claim:

1. A method for assigning channels in a radio communications system, which comprises:

using a time division duplex transmission method with timeslots as channels for a radio transmission between a base station and mobile stations and with switching points separating the timeslots for an up-link direction and the timeslots for a down-link direction;

defining in each case at least one transmission parameter relating to a transmission quality for the radio transmission between the base station and the mobile stations; and assigning the timeslots close to a switching point of the switching points to the mobile stations having a qualitatively better transmission parameter.

2. The method according to claim 1, which comprises defining an area switching point for a group of adjacent base stations, the mobile stations with the qualitatively better transmission parameter are assigned the timeslots between a radio-cell-specific switching point and the area switching point.

3. The method according to claim 2, which comprises defining an upper boundary for a difference between the radio-cell-specific switching point and the area switching point.

4. The method according to claim 3, which comprises setting the upper boundary in dependence on a number of the mobile stations for which a qualitatively good transmission parameter has been defined.

5. The method according to claim 2, which comprises defining a base switching point, and from the base switching point, radio-cell-specific switching points and area switching points may have an error of only a maximum of a further upper boundary.

6. The method according to claim 5, which comprises managing between groups of base stations with different area switching points buffer zones having radio cells in which the base switching point is binding.

7. The method according to claim 1, wherein the at least one transmission parameter is in each case related to a signal delay time between the base station and the mobile stations with short signal delay times being qualitatively better.

8. The method according to claim 1, wherein the at least one transmission parameter is in each case related to a reception power level in a respective receiving station with high reception power levels being qualitatively better.

9. The method according to claim 1, wherein the at least one transmission parameter is in each case related to an interference influence on the radio transmission from and to a respective mobile station on adjacent radio cells with a low interference influence being qualitatively better.

10. The method according to claim 1, wherein the at least one transmission parameter is in each case related to a position of a respective mobile station within a radio cell of the base station with a position in a core region of the radio cell being qualitatively better.

11. The method according to claim 1, wherein the radio transmission within at least parts of the radio communications system is frame-synchronous, and switching points of adjacent base stations are set in dependence on traffic.

12. A method for assigning channels in a radio communications system, which comprises:

using a TDD transmission method with timeslots as channels for a radio transmission between a base station and mobile stations, and with at least one switching point separating the timeslots for an up link direction and the timeslots for a down link direction;

defining a standard TDD scheme for a position of the at least one switching point;

defining in each case at least one transmission parameter relating to a transmission quality for the radio transmission between the base station and the mobile stations; and assigning the mobile stations with a qualitatively better transmission parameter the timeslots close to the at least one switching point, the timeslots being used rather than the standard TDD scheme for an opposite transmission direction.

13. The method according to claim 12, wherein the at least one transmission parameter is in each case related to a signal delay time between the base station and the mobile stations with short signal delay times being qualitatively better.

14. The method according to claim 12, wherein the at least one transmission parameter is in each case related to a reception power level in a respective receiving station with high reception power levels being qualitatively better.

15. The method according to claim 12, wherein the at least one transmission parameter is in each case related to an interference influence on the radio transmission from and to a respective mobile station on adjacent radio cells with a low interference influence being qualitatively better.

16. The method according to claim 12, wherein the at least one transmission parameter is in each case related to a position of a respective mobile station within a radio cell of the base station with a position in a core region of the radio cell being qualitatively better.

17. The method according to claim 12, wherein the radio transmission within at least parts of the radio communications system is frame-synchronous, and switching points of adjacent base stations are set in dependence on traffic.

18. A radio communications system, comprising:

a plurality of mobile stations; and a plurality of base stations, said base stations and said mobile stations having a radio interface for connecting said mobile stations to said base stations, said radio interface organized on a basis of a TDD transmission method with timeslots as channels and a switching point separating said timeslots for an up link direction and said timeslots for a down link direction, said base stations having a device for defining a transmission quality of transmission parameters between a respective base station and in each case one mobile station of said mobile stations, said base stations further having an assignment device for setting said switching point and for assigning said timeslots close to said switching point to said mobile stations with a qualitatively better transmission parameter.

19. The radio communications system according to claim 18, wherein said device for defining the transmission quality of the transmission parameters evaluates signals output by said mobile stations and received by said base stations.

20. The radio communications system according to claim 18, wherein said device for defining the transmission quality of the transmission parameters evaluates signals output by said base stations and received by said mobile stations once said mobile stations have signaled parameters relating to the transmission parameter.

* * * * *

UNITED STATES PATENT AND TRADEMARK OFFICE
CERTIFICATE OF CORRECTION

PATENT NO. : 6,434,128 B1
DATED : August 13, 2002
INVENTOR(S) : Michael Benz et al.

It is certified that error appears in the above-identified patent and that said Letters Patent is hereby corrected as shown below:

<u>Title page,</u>
Item [30], should read as follows:

-- Foreign Application Priority Data

Aug. 7, 1998 (EP) ................98 114 943.8 --

Signed and Sealed this

Fifth Day of November, 2002

Attest:

Attesting Officer

JAMES E. ROGAN
*Director of the United States Patent and Trademark Office*